US011858254B2

(12) United States Patent
Zaborowski et al.

(10) Patent No.: US 11,858,254 B2
(45) Date of Patent: Jan. 2, 2024

(54) ACTIVE CARD COOLING IN A CARD PROCESSING MACHINE

(71) Applicant: ENTRUST CORPORATION, Shakopee, MN (US)

(72) Inventors: Alexander K. Zaborowski, Shakopee, MN (US); Craig Berry, Shakopee, MN (US); Rajesh K. Juriasingani, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 37 days.

(21) Appl. No.: 17/387,267

(22) Filed: Jul. 28, 2021

(65) Prior Publication Data

US 2021/0354442 A1 Nov. 18, 2021

Related U.S. Application Data

(63) Continuation of application No. 15/802,004, filed on Nov. 2, 2017, now Pat. No. 11,084,279.

(60) Provisional application No. 62/416,458, filed on Nov. 2, 2016.

(51) Int. Cl.
*B41F 23/04* (2006.01)
*B42D 25/40* (2014.01)
*B41F 16/00* (2006.01)

(52) U.S. Cl.
CPC ...... *B41F 23/0476* (2013.01); *B41F 16/0026* (2013.01); *B42D 25/40* (2014.10)

(58) Field of Classification Search
None
See application file for complete search history.

(56) References Cited

U.S. PATENT DOCUMENTS

| | | | |
|---|---|---|---|
| 4,268,345 | A | 5/1981 | Semchuck |
| 4,825,054 | A | 4/1989 | Rust et al. |
| 5,266,781 | A | 11/1993 | Warwick et al. |
| 5,637,174 | A | 6/1997 | Field et al. |
| 6,138,893 | A | 10/2000 | Caletka et al. |
| 6,159,327 | A | 12/2000 | Forkert |
| 6,352,095 | B1 | 3/2002 | Fulmer et al. |
| 6,484,780 | B2 | 11/2002 | Ashley et al. |
| 6,781,842 | B2 | 8/2004 | Chen et al. |

(Continued)

FOREIGN PATENT DOCUMENTS

| | | |
|---|---|---|
| CN | 217455437 U * | 9/2022 |
| JP | 04003159 A | 1/1992 |

(Continued)

OTHER PUBLICATIONS

English language machine translation of CN 217455437 U, publication date Sep. 2022. (Year: 2022).*
English language machine translation of JP 2011-230329 A, publication date Nov. 2011. (Year: 2011).*
Office Action issued in Chinese Patent Application No. 201780081505.7, dated Oct. 9, 2022 (9 pages).

(Continued)

*Primary Examiner* — Leslie J Evanisko
(74) *Attorney, Agent, or Firm* — Hamre, Schumann, Mueller & Larson, P.C.

(57) ABSTRACT

Methods and systems of actively cooling a card while the card is within a card processing machine are described. One or more cooling stations are provided within the card processing machine to actively cool the card prior to performing a processing operation, during a processing operation, and/or after a processing operation on the card in order to reduce a temperature of the surface of the card.

3 Claims, 3 Drawing Sheets

(56) References Cited

U.S. PATENT DOCUMENTS

Figure 1:
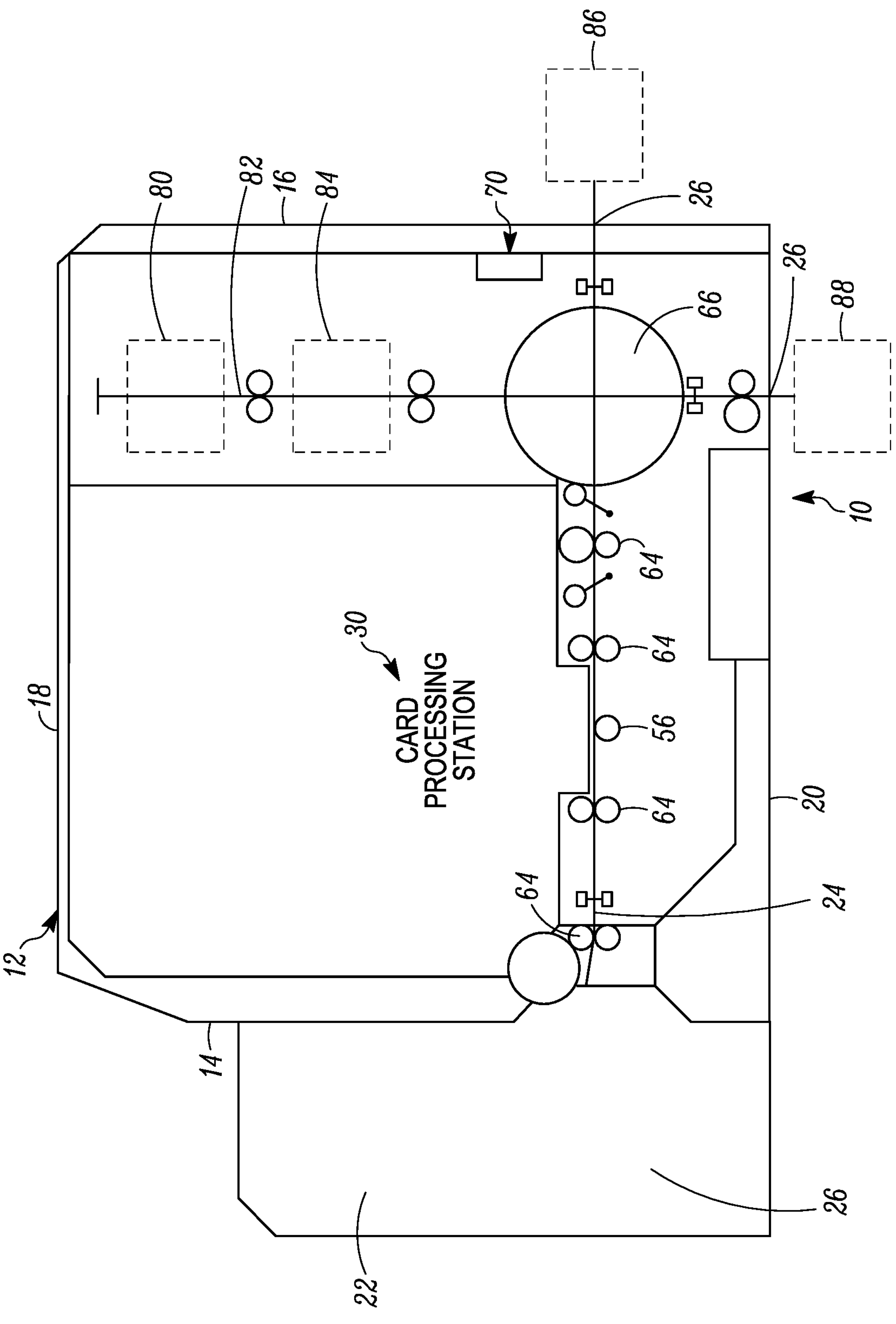

| | | | |
|---|---|---|---|
| 6,783,067 B2 | 8/2004 | Kreuter et al. | |
| 6,902,107 B2 | 6/2005 | Shay et al. | |
| 7,398,972 B2 | 7/2008 | Schuller et al. | |
| 7,434,728 B2 | 10/2008 | Paulson et al. | |
| 9,180,713 B2 * | 11/2015 | Aihara | G03G 15/1615 |
| 2002/0135658 A1 | 9/2002 | Minowa et al. | |
| 2004/0066441 A1 | 4/2004 | Jones et al. | |
| 2004/0207714 A1 | 10/2004 | Takahashi et al. | |
| 2005/0181167 A1 | 8/2005 | Behnen | |
| 2006/0196601 A1 | 9/2006 | Takahashi et al. | |
| 2011/0206841 A1 | 8/2011 | Sabater Vilella | |
| 2012/0176460 A1 * | 7/2012 | Mochizuki | B41J 2/0057 347/213 |
| 2013/0220984 A1 | 8/2013 | Cronin et al. | |
| 2014/0238254 A1 | 8/2014 | Aihara et al. | |
| 2015/0028106 A1 | 1/2015 | Lee | |
| 2015/0209980 A1 | 7/2015 | Weber | |
| 2016/0300128 A1 | 10/2016 | Alvig et al. | |

FOREIGN PATENT DOCUMENTS

| | | | |
|---|---|---|---|
| JP | H08-39844 | A | 2/1996 |
| JP | 2001-246885 | A | 9/2001 |
| JP | 2003159753 | A | 6/2003 |
| JP | 2011-230329 | A | 11/2011 |
| KR | 101009307 | B1 | 1/2011 |

OTHER PUBLICATIONS

International Search Report and Written Opinion issued in PCT/US2017/059695, dated May 15, 2018, 11 pages.

* cited by examiner

ACTIVE CARD COOLING IN A CARD PROCESSING MACHINE

FIELD

This disclosure relates to card processing operations conducted on plastic cards in card processing machines such as desktop card processing machines or central issuance, large volume batch processing machines. Before, during, or after a card processing operation on a card, the card can be actively cooled to improve the card processing operation and/or improve the results of the card processing operation.

BACKGROUND

It is known to process plastic cards including, but not limited to, financial (e.g., credit, debit, or the like) cards, driver's licenses, national identification cards, business identification cards, gift cards, and other plastic cards in card processing machines. Examples of card processing machines are desktop card personalization machines that are designed to personalize cards one at a time, for example on the order of tens or hundreds per hour, or central issuance card personalization machines that are designed to simultaneously personalize multiple cards, for example on the order of thousands per hour.

While present in a card processing machine, the card may be heated. Heating may occur a number of ways. For example, heating may occur through exposure to an internal ambient temperature of the card processing machine, which temperature may be elevated compared to the external ambient temperature outside of the card processing machine. Heating may also occur as a direct result of a processing operation performed on the card. A card that has an excessive temperature can interfere with, and degrade the quality of, a card processing operation.

SUMMARY

Methods and systems of actively cooling a card while the card is within a card processing machine are described herein. One or more cooling stations are provided within the card processing machine to actively cool the card prior to performing a processing operation, cool the card during a processing operation, and/or cool the card after a processing operation on the card in order to reduce a temperature of the surface of the card.

In one embodiment, a method of processing a plastic card includes inputting the plastic card into a card processing machine having a card processing station, performing a processing operation on the plastic card in the card processing station, and prior to performing the processing operation, during the processing operation, and/or after the processing operation, actively cooling a surface of the plastic card in order to reduce a temperature of the surface of the plastic card.

In another embodiment, a card processing machine includes a card input, a card output, a card processing station, a cooling station configured to actively cool a surface of a plastic card that is input into the card processing machine in order to reduce a temperature of the surface of the plastic card, and a card transport mechanism for transporting the plastic card through the card processing machine from the card input, to the cooling station and to the card processing station, and to the card output.

DRAWINGS

FIG. 1 schematically illustrates an example of a card processing machine described herein that employs active cooling.

Figure 2:
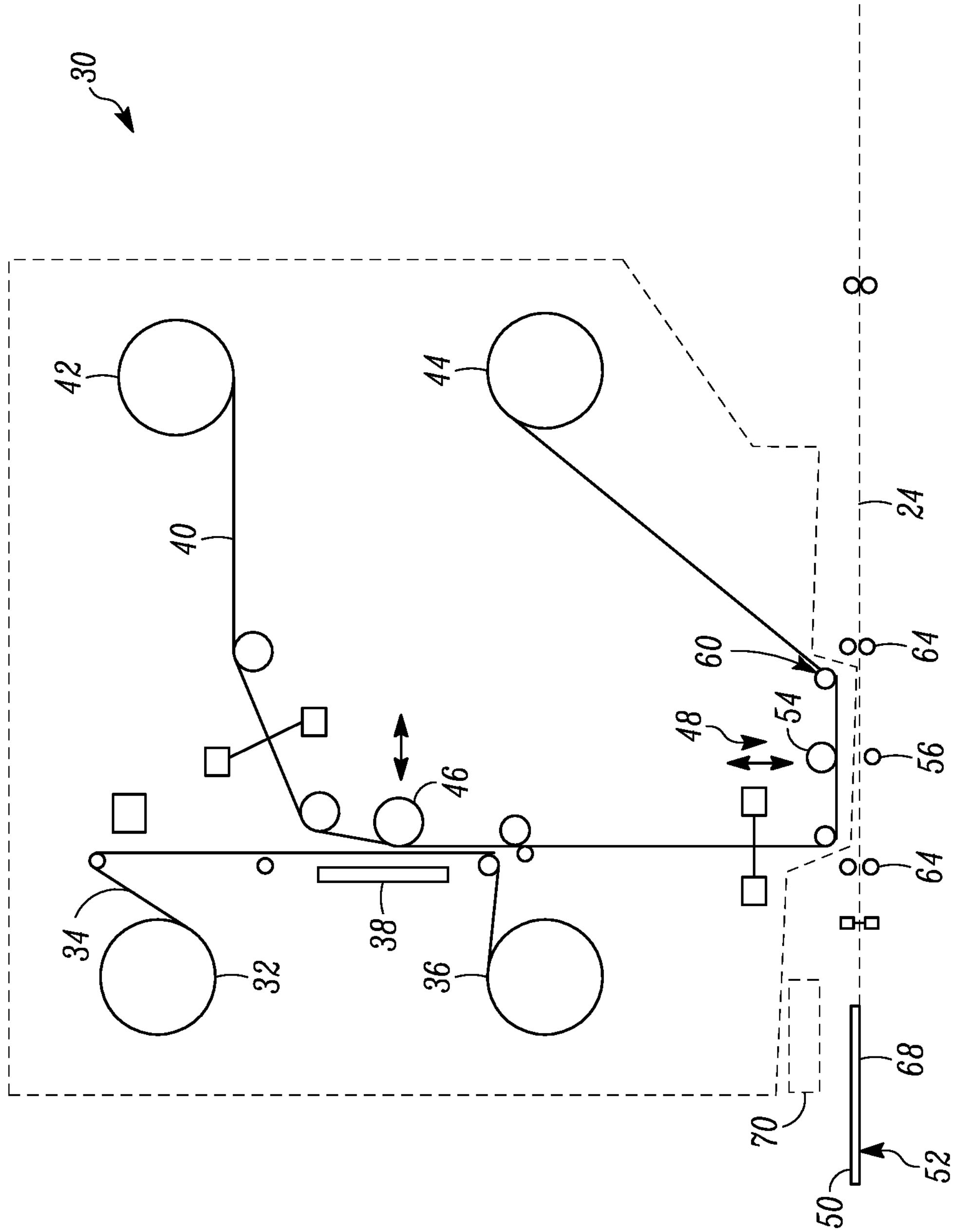

FIG. 2 schematically illustrates an example of a card processing station of the card processing machine of FIG. 1.

Figure 3:
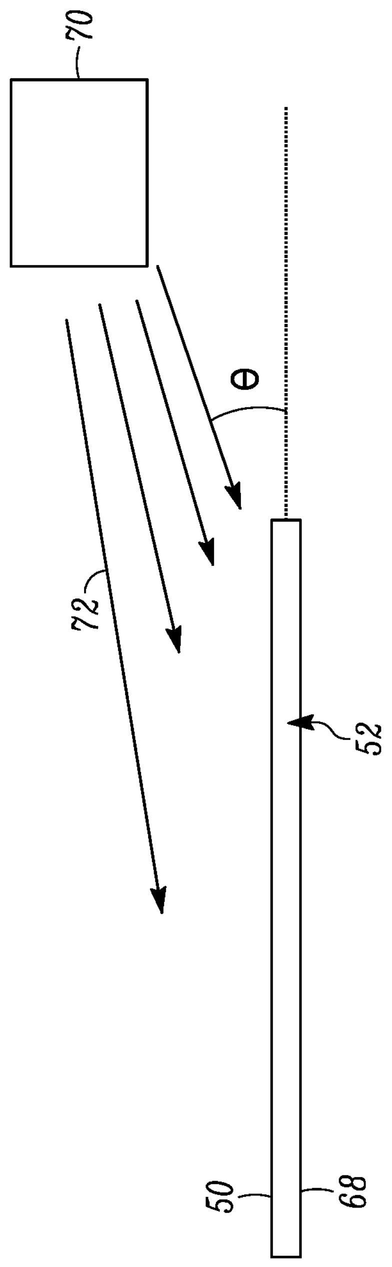

FIG. 3 schematically illustrates a cooling fan blowing air onto a surface of the card.

DETAILED DESCRIPTION

Methods and systems of actively cooling a card while the card is within a card processing machine are described where one or more cooling stations are provided within the card processing machine to actively cool the card prior to performing a processing operation, during a processing operation, and/or after a processing operation on the card in order to reduce a temperature of the card or a surface of the card.

Actively cool, active cooling, and the like as used herein are intended to mean that energy is consumed in the process of cooling the card. In this case, an energy consuming mechanism is provided within the card processing machine at a suitable location to interact with the card in order to reduce the temperature of the card. In one example, the energy consuming mechanism is a fan that is provided within the card processing machine to blow air (or other gas) onto the card to reduce the temperature of the card. Other energy consuming mechanisms can be used as well.

Active cooling could be applied directly to the card itself, or to a structure that the card is in contact with so that the structure in contact with the card operates like a cooling plate to cool the card.

In another embodiment, passive cooling can be utilized or is used separately from and in addition to active cooling. With passive cooling, an energy consuming device is not used to cool the card. Instead, the card can be transported to a desired location in the card processing machine and stopped or "parked" for a period of time allowing the card to passively cool. Therefore, actively cool, active cooling, and the like as used herein is distinguished from and is different than passive cooling.

Reducing the temperature of the card includes and encompasses, but is not limited to, reducing the temperature of the entire card so that the card has a substantially uniform temperature, reducing the temperature of a surface of the card so that the surface has a temperature that is lower than the remainder of the card, and reducing the temperature of one surface of the card so as to cause a reduction in the temperature of the other surface of the card so that a temperature differential exists across the thickness of the card.

A card processing machine as used herein is intended to encompass, but not be limited to, both desktop card personalization machines and central issuance card personalization machines.

A desktop card personalization machine is a type of machine that is typically designed for relatively small scale, individual card personalization and production, for example on the order of tens or hundreds per hour. In these machines, a single card to be personalized is input into the printer, which typically includes one or two personalization/processing capabilities, such as printing and laminating. These printers are often termed desktop printers because they have a relatively small footprint intended to permit the machine to reside on a desktop. Many examples of desktop printers are known, such as the SD or CD family of desktop card printers available from Entrust Datacard Corporation of Shakopee, Minnesota Other examples of desktop card printers are disclosed in U.S. Pat. Nos. 7,434,728 and 7,398,972, each of which is incorporated herein by reference in its entirety.

A central issuance card personalization machine is typically designed for large volume batch production of personalized cards, often employing multiple processing stations or modules, including one or more printing mechanisms, to process multiple cards at the same time to reduce the overall per card processing time. Examples of central issuance card personalization machines include the MX and MPR family of central issuance machines available from Entrust Datacard Corporation of Shakopee, Minnesota Other examples of central issuance machines are disclosed in U.S. Pat. Nos. 4,825,054, 5,266,781, 6,783,067, and 6,902,107, all of which are incorporated herein by reference in their entirety.

The card may be referred to herein as a plastic card or just a card. A plastic card encompassed herein includes, but is not limited to, financial (e.g., credit, debit, or the like) cards, driver's licenses, national identification cards, business identification cards, gift cards, and other plastic cards which bear personalized data unique to the cardholder and/or which bear other card information. A plastic card is primarily made of plastic materials but can include materials other than plastic. In some embodiments, the card may be made primarily of materials other than plastic.

Examples of processing operations that can be performed on the card in the card processing machine include, but are not limited to, retransfer printing on one or both surfaces of the card, direct to card printing on one or both surfaces of the card, laminating one or both surfaces of the card, embossing or indenting one or both surfaces of the card, applying a security feature such as a hologram to one or both surfaces of the card, programming a magnetic stripe on the card, contact or contactless programming of an integrated circuit chip on the card, and other known card processing operations.

Further information on the construction and operation of a card processing machine that can employ the active cooling described herein is disclosed in US Published Application No. 2016/0300128, the entire contents of which are incorporated herein by reference.

Referring now to FIG. 1, an example of a card processing machine 10 that employs active cooling is illustrated. The card processing machine 10 includes a housing 12 having a front side 14, rear side 16, top side 18, and a bottom side 20.

The card processing machine 10 includes a card input 22 for inputting cards into the card processing machine 10. The card input 22 can be located at any position on the card processing machine 10. In the illustrated example, the card input 22 is located at the front side 14 of the housing 12. However, the card input 22 could be located at the rear side 16, the top side 18 or the bottom side 20. Cards are input one-by-one into the machine 10 along a card travel path 24. The card input 22 can be an input slot through which a single card is fed, or as in the illustrated example, the card input 22 can be a card input hopper that holds a plurality of cards waiting to be input and processed in the card processing machine 10.

The card processing machine 10 also includes a card output 26 into or through which processed cards are output from the interior of the card processing machine 10. The card output 26 can be located at any position on the card processing machine 10. In the illustrated example, the card output 26 can be located at the front side 14 of the housing 12. However, the card output 26 could be located at the rear side 16 (see FIG. 1), the top side 18 or the bottom side 20 (see FIG. 1). Processed cards are output one-by-one from the machine 10 into or through the card output 26. The card output 26 can be an output slot through which a single processed card is discharged, or as in the illustrated example, the card output 26 can be a card output hopper that holds a plurality of cards after being processed in the card processing machine 10.

Still referring to FIG. 1, the card processing machine 10 also includes at least one card processing station 30 that is configured to perform a processing operation on the card. Examples of card processing stations 30 include, but are not limited to, a retransfer printing station that performs retransfer printing on one or both surfaces of the card, a printing station that performs direct to card printing on one or both surfaces of the card, a laminator that performs laminating one or both surfaces of the card, an embosser or indenter that performs embossing or indenting one or both surfaces of the card, a foil or patch applicator that applies, for example by lamination, a security feature such as a hologram to one or both surfaces of the card, and other known card processing stations.

For sake of convenience, the card processing station 30 will be described with further reference to FIG. 2 as being a retransfer printing station that performs retransfer printing. An example of a card personalization machine that can perform retransfer printing is described in U.S. Published Application No. 2016/0300128, filed on Apr. 8, 2016, which is incorporated herein by reference in its entirety. The general construction and operation of retransfer printers, including the print ribbon, the retransfer film, printing an image on the retransfer film, and transferring the printed image onto a surface of a card, is well known in the art.

The retransfer printing station illustrated in FIG. 2 includes a print side that includes print ribbon supply 32 from which a supply of monochrome or multi-color print ribbon 34 is supplied, and a print ribbon take-up 36 that takes-up used print ribbon 34. The print ribbon is directed past a print head 38, which in the illustrated example can be stationary, which transfers dye or pigment ink from the print ribbon 34 onto a retransfer film 40. After printing, the used print ribbon 34 is then wound onto the take-up 36.

The retransfer film 40 is supplied from a film supply 42 on a retransfer side, and after retransfer the remaining film is wound onto a film take-up 44 also on the retransfer side. The retransfer film 40 is directed past a platen roller 46 positioned opposite the print head 38 and which in the illustrated example can be moved toward and away from the print head 38 to press the retransfer film 40 and the print ribbon 34 between the print head 38 and the platen roller 46 during printing onto the retransfer film 40.

Once a desired image is printed onto the retransfer film 40, the section of the retransfer film 40 with the printed image thereon is advanced to a transfer station 48 where the printed image on the retransfer film 40 is transferred onto a surface 50, such as the rear surface, of a card 52. The surface 50 can include features such as a signature panel that provides a location for the intended card holder to sign their name, text, graphics, and other features commonly found on the rear surfaces of plastic cards. In this example, the transfer station 48 includes a heated transfer mechanism 54, for example a transfer roller, that is movable toward and away from a fixed platen 56 positioned on the opposite side of the card travel or transport path 24. The heated transfer mechanism 54 presses the portion of the retransfer film 40 containing the printed image against the surface 50 of the card 52 which is backed by the platen 56, with the retransfer film 40 and the card 52 then being transported together past the heated transfer mechanism 54 to transfer the layer of the retransfer film 40 containing the printed image onto the card surface 50. The retransfer film 40 and the card 52 are then transported to a stripping station 60 that includes a stripping mechanism where the retransfer film 40 is stripped from the card surface 50 leaving behind the printed image on the card surface 50. The remainder of the retransfer film 40, minus the transferred image, is then wound onto the film take-up 44.

Returning to FIG. 1, a card reorienting mechanism 66 (or card flipper 66) is located downstream of the stripping station 60 in the card travel path 24. The card reorienting mechanism 66 can receive the card 52 after the printed image has been applied to the surface 50, and flip the card 52 over (i.e. flip the card 180 degrees) so that the opposite surface 68, such as the front surface, is now facing upward. The surface 68 can include features such as the intended card holders name, an account number, a portrait image of the intended card holder, text, graphics, and other features commonly found on the front surfaces of plastic cards. The card 52 can then be transported back upstream of the transfer station 48 in order to retransfer print a printed image onto the surface 68. Examples of card reorienting mechanisms are described in U.S. 2013/0220984 and U.S. Pat. No. 7,398,972 each of which is incorporated herein by reference in its entirety.

In some embodiments, in the case of retransfer printing, the rear surface 50 is printed first followed by printing on the front surface 68. However, other printing sequences can be used.

The card 52 is transported along the card travel path 24 by a card transport mechanism, such as sets of rollers 64. The card transport mechanism transports the card 52 throughout the card processing machine 10 including from the card input, to and/or through the card reorienting mechanism 66, to and/or through a cooling station (described below), to and/or through the card processing station 30, and to the card output 26.

In some embodiments, one or more additional card processing stations can be included within and/or connected to the card processing machine 10. For example, referring to FIG. 1, a contact and/or contactless chip programming station 80 can be provided along a vertical card transport path 82 extending from the card reorienting mechanism 66. The chip programming station 80 is configured to perform contact or contactless programming of an integrated circuit chip on the card 52. In another example, a magnetic stripe programming station 84 can be provided along the vertical card transport path 82. The magnetic stripe programming station 84 is configured to magnetically read and/or write data from/to a magnetic stripe on the card 52.

An additional card processing station 86 can be located at the rear of the machine 10 in communication with the outlet 26 in the rear wall 16. Alternatively, an additional card processing station 88 can be located at the bottom of the machine 10 in communication with the outlet 26 in the bottom wall 20. Further information on additional card processing stations 80, 84, 86, 88 are disclosed in U.S. Published Application No. 2016/0300128, filed on Apr. 8, 2016, which is incorporated herein by reference in its entirety.

One or more card cooling stations are provided at suitable locations in the card processing machine 10. The cooling station(s) is configured to actively or passively cool either of the card surfaces 50, 68 in order to reduce a temperature of the surface of the card 52. Prior to performing a processing operation (such as, but not limited to, retransfer printing) on the card, during the processing operation, or after the processing operation, a surface of the plastic card is cooled while the card 52 is at the cooling station in order to reduce a temperature of the surface of the card. Any form of active or passive cooling that results in a reduction of the temperature of the card surface prior to transferring the image or prior to a subsequent card processing operation can be utilized. In some embodiments, the card can be cooled so that the temperature of the first side of the card is approximately the same as the temperature of the second side during the stripping process. In some embodiments, the card is cooled so that one or both surfaces are cooled to room temperature.

For example, referring to FIG. 1, the card reorienting mechanism 66 also forms a cooling station at which the card 52 is cooled. In this embodiment, a cooling fan 70 is located near the card reorienting mechanism 66. The cooling fan 70 is positioned and oriented to direct a stream of air onto the card 52 while the card 52 is within the card reorienting mechanism 66. For example, if the card 52 is held in the reorienting mechanism 66 with the card surface 50 facing generally upward, the fan 70 can direct a stream of air onto the surface 50 in order to cool the surface 50. The angle of the card 52 relative to the stream of air from the fan 70 can also be adjusted by the card reorienting mechanism 66 via suitable rotation thereof.

In another possible example, with reference to FIG. 2, the cooling station can be located at a position upstream of the transfer station 48, with the fan 70 positioned above the card travel path 24 (as illustrated) or below the card travel path 24 (not illustrated) to direct a stream of air onto the card 52.

The cooling station and the fan 70 can be located anywhere in the card processing machine 10 where the card is able to be actively cooled by a stream of air from the fan 70 or other cooling mechanism. The card 52 can be transported to and held at the cooling station any time prior to performing the processing operation, during the processing operation, or after the processing operation. For example, the card 52 can be transported to the cooling station anytime:

1—the card 52 is waiting for the print process onto the retransfer film 40 or another process to complete.

2—purposely for a user-defined predetermined time or time delay prior to performing a card processing operation. The time delay provides additional cooling time during which the card 52 waits in the cooling station. The time delay can include or be in addition to any cooling time incurred when waiting for another process to complete. Examples of when the time delay can be implemented include, but are not limited to, before transferring the printed image onto the card, waiting to hand off the card to another card processing mechanism such as to an upstream card processing module, or the like. The time delay can be set by the user & adjusted based on factors such as, but not limited to, environmental conditions and card type. In one non-limiting embodiment, the time delay can be in the range of 5-10 seconds.

3—between double applications of retransfer media from the retransfer film 40 onto the surface 50 or the surface 68, for example after performing a first retransfer printing operation on the surface 50 or 68 and prior to performing a second retransfer printing operation on the same surface 50 or 68.

4—before handing the card off to another card processing mechanism (which could be within the card processing mechanism 10 or connected to the card processing mechanism 10 to receive the card directly from the card processing mechanism).

FIG. 3 illustrates an example of the fan 70 directing a stream of air 72 onto the surface, for example the surface 50, of the card 52. In this example, the stream of air 72 contacts the surface at an angle θ. In one embodiment, the angle θ can be about 45 degrees. In other embodiments, the stream of air 72 can contact the surface of the card at substantially a 90 degree angle to the surface (i.e. substantially perpendicular to the surface) of the card. However, any angle that results in sufficient cooling of the card can be utilized.

In one example, where the processing station 30 is a retransfer printing station as described above in FIG. 2, the time to program a chip or write data to the magnetic stripe on the card 52 may be shorter than the time for printing an image onto the retransfer film 40. Accordingly, in such an embodiment, the card can be transported to the chip programming station 80 to program the chip and/or to the magnetic stripe programming station 84 to write data to the magnetic strip, and thereafter the card 52 can be transported to the cooling station, such as the card reorienting mechanism 66, and the card 52 "parked" in the cooling station for a period of time during which the card 52 is actively cooled by the fan 70. The card 52 can then be moved out of the cooling station and transferred to the retransfer printing station where the image can be printed/applied to a surface of the cooled card 52.

In another example, the card 52 can be "parked" in the cooling station for a period of time during which the card 52 is cooled, either actively or passively as discussed further below, after printing on one side of the card 52 and while the image for the opposite side of the card 52 is being produced/printed onto the retransfer film 40 prior to retransfer onto the card surface.

In an alternative embodiment, passive cooling can be utilized to cool the card 52. For example, the card 52 can be transported to a cooling station, such as but not limited to the card reorienting mechanism 66, where the card 52 is held stationary or "parked" for a period of time while the card 52 passively cools. For example, where the processing station 30 is a retransfer printing station as described above in FIG. 2, the time to program a chip or write data to the magnetic stripe on the card 52 may be shorter than the time for printing an image onto the retransfer film 40. Accordingly, in such an embodiment, the card can be transported to the chip programming station 80 to program the chip and/or to the magnetic stripe programming station 84 to write data to the magnetic strip, and thereafter the card 52 can be transported to the cooling station, such as the card reorienting mechanism 66, and the card 52 "parked" during the remaining time where the image is being printed on the retransfer film 40. During that remaining time, the card 52 passively cools while the card 52 is parked in the cooling station. The card 52 can then be moved out of the cooling station and transferred to the retransfer printing station where the image can be printed/applied to a surface of the cooled card 52.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of retransfer printing on a plastic card in a plastic card processing machine, comprising:

inputting the plastic card into the plastic card processing machine having a card travel path along which the plastic card is transported, a retransfer printing station with a print side having a print ribbon and a print head, and a retransfer side having a retransfer film;

performing a retransfer printing operation on a surface of the plastic card in the retransfer printing station, the retransfer printing operation includes printing an image on a portion of the retransfer film, applying the portion of the retransfer film with the printed image to the surface of the plastic card and thereafter stripping the retransfer film from the surface of the plastic card;

during the retransfer printing operation, actively cooling the surface of the plastic card by directing a flow of air from a cooling fan located above the card travel path toward the surface of the plastic card.

2. The method of claim 1, wherein actively cooling the surface of the plastic card occurs after applying the portion of the retransfer film with the printed image to the surface of the plastic card and prior to stripping the retransfer film from the surface of the plastic card.

3. A method of retransfer printing on a surface of a plastic card in a plastic card processing machine having a card travel path along which the plastic card is transported, a retransfer printing station with a print side and a retransfer side having a retransfer film, comprising:

performing a retransfer printing operation in the retransfer printing station, the retransfer printing operation includes printing an image on a portion of the retransfer film, applying the portion of the retransfer film with the printed image to the surface of the plastic card and thereafter stripping the retransfer film from the surface of the plastic card;

after applying the portion of the retransfer film with the printed image to the surface of the plastic card and prior to stripping the retransfer film from the surface of the plastic card, directing a flow of air toward the surface of the plastic card from a cooling fan located above the card travel path.

* * * * *